United States Patent [19]

Yukawa et al.

[11] 4,415,261
[45] Nov. 15, 1983

[54] AN IMPROVED PLATEN COVER FOR A COPYING MACHINE

[75] Inventors: Koji Yukawa; Takashi Murahashi; Isao Sakurai, all of Hachioji, Japan

[73] Assignee: Konishiroku Photo Industry Co., Ltd., Tokyo, Japan

[21] Appl. No.: 302,587

[22] Filed: Sep. 15, 1981

[30] Foreign Application Priority Data

Sep. 26, 1980 [JP] Japan .................................. 55-134979

[51] Int. Cl.³ .............................................. G03B 27/62
[52] U.S. Cl. ...................................... 355/75; 355/3 R
[58] Field of Search ................... 355/75, 7, 133, 3 ER

[56] References Cited

U.S. PATENT DOCUMENTS

| 3,713,861 | 1/1973 | Sharp | 355/133 X |
| 3,788,737 | 1/1974 | Kidd | 355/7 X |
| 3,799,666 | 3/1974 | Furushima et al. | 355/7 X |
| 4,338,020 | 7/1982 | Yukawa et al. | 355/75 X |

Primary Examiner—Richard A. Wintercorn
Attorney, Agent, or Firm—Jordan B. Bierman; Linda Bierman

[57] ABSTRACT

An improved platen cover for overlying original documents disposed atop a transparent plate for optical scanning in a copying machine includes marks or patterns on its surface facing the transparent plate. The marks or patterns are placed on the platen cover surface utilizing a fluorescent paint so that the marks or patterns do not reproduce on or degrade the quality of the copy of the original document operatively produced by the machine.

5 Claims, 3 Drawing Figures

AN IMPROVED PLATEN COVER FOR A COPYING MACHINE

BACKGROUND OF THE INVENTION

1. Field of the Invention:

The present invention relates to a copying machine and, more particularly, to a copying machine having a transparent plate on which an original to be copied is placed and an improved platen cover for overlying an original placed on the transparent plate.

2. Description of the Prior Art:

There have thus far been publicly known copying machines having the structures and functions shown, by way of example, in the sectional view of FIG. 1. Such machines include a photosensitive drum 1 having photoconductive material overlying the cylindrical surface thereof and, arranged in adjoining relation about the drum, a charge generating device 2, a toner developing device 3, an image transfer electrode 4, a separation electrode 5, a charge eliminating electrode 6 and a cleaning device 7 (moving along the direction of drum rotation—which is clockwise in the illustrated apparatus). Each sheet of recording paper 9 fed from magazine 8 passes between photosensitive drum 1 and image transfer electrode 4, during which a toner image on photosensitive drum 1 is transferred onto recording paper 9 and then ejected from the machine through a conveyance device 10 and a fixing device 11.

On the upper part of housing 12, a moving document glass plate 13 is moved at a limited speed in the direction of arrow "A" and carries a transparent plate 14 normally comprising a flat plane for receiving thereon an original D to be copied. A platen cover 15 serves to cover an original D placed atop transparent plate 14.

Directly under moving document glass plate 13, a light source 16 (such as a fluorescent lamp) illuminates original D through transparent plate 14. In addition, an optical exposure system comprising a mirror 17, a lens 18 and a mirror 19 is disposed between glass plate 13 and drum 1, through which optical system an image of an original D on transparent plate 14 is focussed onto the surface of photosensitive drum 1.

After photosensitive drum 1 is charged by charge generating device 2, an electrostatic latent image is formed on its photosensitive surface in accordance with the image of original D focussed onto the surface of rotating drum 1. This electrostatic latent image on the surface of drum 1 is then converted to a visible toner image thereof on passage through toner developing device 3.

In the copying machine just described, the optical exposure system is fixed while a document glass plate 13 is moved synchronously with the rotation of a photosensitive drum 1 to form an electrostatic latent image of an original D on the surface of the drum. Also publicly known are copying machines in which the document glass plate remains fixed on the machine housing and the optical exposure system is moved synchronously with the photosensitive drum to form an electrostatic latent image of an original D on the photosensitive drum.

In both these types of copying machines, a platen cover 15 is normally utilized to press the original D on transparent plate 14; if no platen cover is used, the following defects result:

(1) Shifts in the relative positions of an original and a recording sheet of the same size cause a black line to appear on the edge of the recording paper, degrading the quality of the resulting copy image.

(2) When copying on a recording sheet of larger size than that of the original to be copied, a black frame appears around the image reproduced on the recording sheet with a corresponding degradation of copy image quality.

(3) When the original to be copied is smaller than the size of the machine's capability for accepting original documents, an electrostatic latent image corresponding to the area of the difference of the sizes between them is formed on the circumference of the photosensitive drum 1; toner particles therefore adhere to that area of the latent image, whereby not only is toner wasted in large quantity, but the cleaning device is heavily loaded.

In order to remedy these defects, a platen cover is used to cover the original to be copied. Because the surface of the cover facing the transparent plate should have an optical reflection factor equivalent to or higher than that of a white surface (which is normally the background color of an original), however, it has thus far proved impossible to paint or print a letter, mark or pattern onto the surface of the platen cover that faces the transparent plate without degrading the quality of the resulting reproduction.

SUMMARY OF THE INVENTION

An object of the present invention is to provide a copying machine wherein a letter, mark or pattern can be painted, printed or pasted on the surface of the platen cover that has the transparent plate without any degradation of copy image quality or any deterioration of machine functions.

The aforesaid object of the invention can be achieved with a copying machine having a housing, a transparent plate on which an original to be copied is placed, and a platen cover by which the original placed on said transparent plate is covered, wherein the platen cover surface facing the transparent plate is provided with a letter, mark or pattern formed of a fluorescent paint or pigment.

DETAILED DESCRIPTION OF THE PREFERRED EMBODIMENTS

Figure 1:
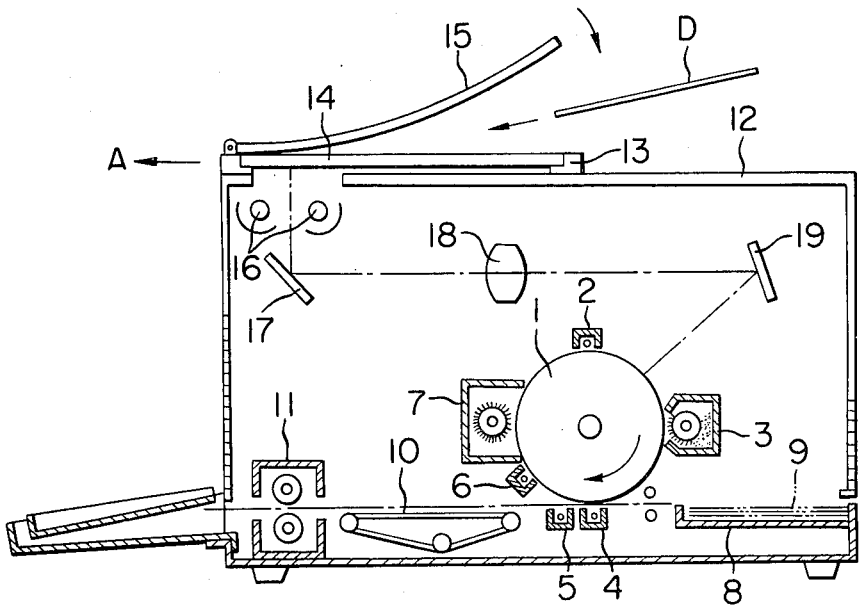
FIG. 1 is a overall cross-sectional view of a copying machine.

In accordance with the invention, a letter, mark or pattern on the platen cover can serve as a means for enabling automatic discrimination of the size of an original to be copied.

An example of the invention is now explained referring to the drawings attached hereto.

Figure 2:
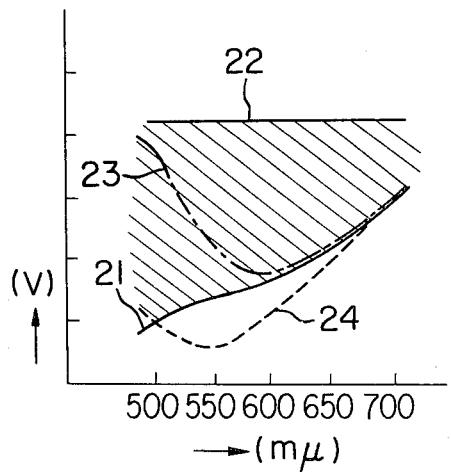
FIG. 2 is a graph expressing the relation between the spectral wavelength of an original image to be copied and the surface potential of a photosensitive substance.

FIG. 2 illustrates the relation between the color of an original image being copied (i.e. the wavelength of light reflected from the original) and the surface potential of the photosensitive substance onto which the image is reflected, wherein selenium is utilized for the photoconductive material or substance and a fluorsecent lamp comprises the exposure light source. The vertical axis of FIG. 2 represents the surface potential (V) of the photosensitive substance and the horizontal axis represents the wavelength (in m) of the light source. The curve designated by reference numeral 21 denotes the case wherein the original image appears in white, while curve 22 illustrates the case in which the original image appears in black. It should accordingly be recognized from these two cases that the spectral characteristics of any original image with respect to the surface potential retained on the photosensitive substance lie within the area obliquely lined and bounded by curves 21 and 22 in FIG. 2. For example, where yellow paints or inks make up the original image, its spectral characteristics are expressed by the curve 23. In other words, no matter what color is selected for or comprises an original image to be copied, its spectral characteristics cannot fall below the area bounded by curve 21, and only when the color of the original image is in white will the surface potential of the photosensitive substance be at its minimum value. Thus, if a letter, mark or pattern is provided in a distinguishable form on the surface of the platen cover facing the transparent plate then—depending upon the color variety and density of the letter, mark or the like—an electrostatic latent image of the letter or mark and having a higher surface potential than that resulting from a white colored original will be formed on the photosensitive substance, with a corresponding degradation of copy image quality and an unnecessary waste of toner.

The above-mentioned difficulties can be overcome if such letter, mark or pattern is coated, printed or otherwise affixed onto the side of the platen cover facing the transparent plate using paints having a higher optical reflection factor than that of the color white. The present invention has resulted from a recognition of these points and in implementing the same, fluorescent paints may be utilized by way of example.

Figure 3:
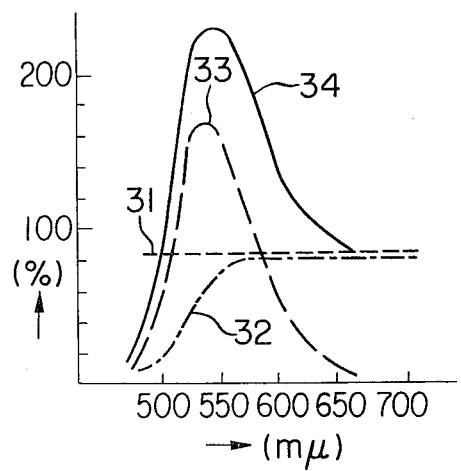
FIG. 3 is a graph expressing the relation between the spectral wavelength of an image to be copied and the reflection factor thereof.

FIG. 3 shows the relation between the spectral wavelength and the reflection factor of an original image to be copied, wherein the vertical axis represents the reflection factor (expressed as a percentage) and the horizontal axis represents the wavelength (in m). The curve designated by numeral 32 shows the reflection rate of a normal type of yellow paint. Observing FIG. 3 with respect to FIG. 2, curve 31 of FIG. 3 corresponds to the surface potential characteristics of a photosensitive substance as expressed by curve 21 (for white color) in FIG. 2, and curve 32 in FIG. 3 corresponds to the surface potential characteristics of a photosensitive substance as expressed by curve 23 (for yellow color) in FIG. 2. Thus, the resulting difference in surface potential where the original image is yellow and where the original image is white (yellow produces a higher surface potential, as shown by curves 21 and 23 in FIG. 2) causes correspondingly and proportionately increased toner density in the copy image formed.

On the other hand, curve 34 of FIG. 3 expresses the spectral sensitivity characteristics of yellow paints made of fluorescent pigments and indicates a far higher reflection factor than the reflection rate for a white paper as illustrated by curve 31. The corresponding surface potential of a photosensitive substance upon which light impinging on fluorescent yellow pigments is reflected is shown by curve 24 in FIG. 2, from which it is clear that the potential thereof is even lower than that obtained when a white paper is used (curve 21).

Consequently, if paint made of fluorescent pigments of this kind is used to print, paste or otherwise affix a letter, mark or pattern on the side of the platen cover facing the transparent plate, said letter, mark or pattern or the like will not form an image on the recording paper and there is therefore no justification or need for following the conventional practice by which the side of the platen cover facing the transparent plate is whitened.

In FIG. 3, curve 33 expresses the emission spectrum (fluorescent factor) of a fluorescent pigment and, from the foregoing, the relation that curve 34=curve 32 (reflection factor)+curve 33 (fluorescent factor) can be understood.

The following discussion presents an example of a practical application utilizing the teachings of the invention to attain a novel function not feasible with a conventional type copying machine. By painting or printing a letter, mark or pattern on the side of an original platen cover facing a transparent plate in accordance with the invention, many operating enhancements are rendered practical as, for example:

(1) Multi-purpose applications to a platen cover:
  (a) Full discretion to choose any color design of the copying machine itself.
  (b) Printing of operating instructions for an operator, such as an indication mark for positioning an original, onto the side of the platen cover facing the transparent plate.

(2) Adaptation of an automatic detection means for the size of the original.

A copying machine incorporating such an automatic detection means for the size of the original being copied is disclosed in a Japanese patent application of Koji Yukawa and Takashi Murahashi of the present inventors and Masayuki Miyasaki (Japanese Patent Publication No. 97400/1979, laid-open to public inspection under No. 22424/1981) and is the subject of U.S. Pat. No. 4,338,020. As there described, the detecting means include a member colored in a prescribed color and provided on the side of the platen cover facing the transparent plate, an exposure means by which the colored member is illuminated, and a light receiving section for receiving the reflection of the light applied to the colored member from the exposure means. In use, at least a portion of the light emanating from the exposure means and reflected onto the light receiving section is intercepted or blocked by an original placed on the document glass table, and thus the size of the original can be detected. However, such detecting means presents a problem in that the quality of the copy image is spoiled even where the color of the colored member corresponds to that having the highest spectral sensitivity of the photosensitive substance, because the colored area is copied onto the copy image (this problem is especially serious where the size of the recording paper is larger than the size of the original).

On the other hand, when a paint in accordance with the present invention (such as that made of a fluorescent pigment) is used to paint said colored area, the aforementioned problem is immediately solved, a very effective means for detecting the size of the original is rendered practical, and a copying machine incorporating such means for detecting the size of the original can accordingly be realized.

In addition, in detecting the size of an original (as described in Japanese Patent Application No. 97400/1979), the difference in color between the original and the platen cover can be detected and the size of the original thereby determined. It is therefore sufficient for this application that there be some difference in color between the original and the platen cover and, as a consequence, it is also sufficient if the entire area of the platen cover surface is painted with fluorescent paint—i.e. including the case where the entire area thereof can be uniformly painted in the required pattern.

The present invention consists, as described, in a copying machine characterized in that a letter, mark or pattern is painted, printed, pasted or otherwise affixed on the side of a platen cover facing a transparent plate, by making use of paints (such as fluorescent paints) having a higher reflection factor than that of the color white. Use of the teachings of the invention has the excellent effect of rendering practical a variety of novel applications and usages which have not heretofore been feasible with any conventional type of copying machine.

Although the foregoing example describes the case of yellow paints made of a fluorescent pigment, it should however be understood that practice of the invention is not limited to the use of yellow paints, but can alternatively employ any fluorescent pigment of suitable color according to the spectral sensitivity of the photoconductive material and the exposure lamp used in a particular copying machine.

It is contemplated that a letter, mark or pattern will generally be painted or printed on the side or face of the platen cover facing the transparent plate, with the understanding that such placement need not be so limited. The invention is intended to encompass locating the letter or pattern or the like at any position from which the image will be in focus on the photosensitive substance since the same effect is thereby attainable.

What is claimed is:

1. In a copying machine having a housing, a transparent plate on which an original to be copied is placed, and means for illuminated imaging of the original through the transparent plate and for reflecting an image of the original onto a photosensitive member, an improved platen cover for overlaying the original placed on the transparent plate, the improvement comprising markings on the surface of said platen cover facing the transparent plate and formed of a fluorescent-based material so that when scanning illumination impinging upon those of said markings disposed about the periphery of the overlaid original causes said markings to be reflected onto the photosensitive member, development of the reflected image of the fluorescent-based markings is avoided due to the high reflection characteristics of the fluorescent-based material and copy image integrity is accordingly maintained.

2. In a copying machine in accordance with claim 1, said markings comprising at least a letter or predetermined pattern.

3. In a copying machine in accordance with claim 1, said markings comprising a predetermined pattern for use in automated determination of the size of the original placed on the transparent plate for copying.

4. In a copying machine in accordance with claim 1, said platen cover being white.

5. In a copying machine in accordance with claim 1, said fluorescent-based material comprising a fluorescent pigment of predetermined coloration.

* * * * *